(12) United States Patent
Zeinfeld et al.

(10) Patent No.: US 8,024,230 B2
(45) Date of Patent: Sep. 20, 2011

(54) SYSTEM AND METHOD FOR A VIRTUAL INVENTORY PROGRAM FOR WIRELESS SALES AND SERVICES

(75) Inventors: Andy Zeinfeld, Ashburn, VA (US); Grant Yoder, Arlington, VA (US); Tim Weisbrod, Arlington, VA (US)

(73) Assignee: Simplexity, LLC, Reston, VA (US)

( * ) Notice: Subject to any disclaimer, the term of this patent is extended or adjusted under 35 U.S.C. 154(b) by 213 days.

(21) Appl. No.: 12/394,985

(22) Filed: Feb. 27, 2009

(65) Prior Publication Data

US 2010/0042510 A1 Feb. 18, 2010

Related U.S. Application Data

(60) Provisional application No. 61/089,309, filed on Aug. 15, 2008.

(51) Int. Cl.
*G06Q 30/00* (2006.01)
(52) U.S. Cl. ................ 705/26; 705/28; 705/27
(58) Field of Classification Search .............. 705/26, 705/27, 28
See application file for complete search history.

(56) References Cited

U.S. PATENT DOCUMENTS

| | | | | |
|---|---|---|---|---|
| 6,301,471 | B1* | 10/2001 | Dahm et al. | 455/405 |
| 7,158,945 | B1* | 1/2007 | Wolcott et al. | 705/26 |
| 7,787,863 | B2* | 8/2010 | van de Groenendaal | 455/411 |
| 7,835,951 | B1* | 11/2010 | Burger et al. | 705/28 |
| 2002/0016740 | A1* | 2/2002 | Ogasawara | 705/26 |
| 2003/0036970 | A1* | 2/2003 | Brustoloni | 705/26 |

* cited by examiner

*Primary Examiner* — Vanel Frenel
(74) *Attorney, Agent, or Firm* — SNR Denton US LLP

(57) ABSTRACT

An embodiment of a method, system, and apparatus for providing a virtual inventory program for wireless sales and services includes receiving an indication of a selected wireless device, and receiving an indication of a selected wireless rate plan associated with the selected wireless device. The method further includes storing a customer order including the selected wireless device and the selected wireless rate plan, and sending the customer order to a wireless service provider associated with at least one of the selected wireless devices and the selected wireless rate plan. The wireless service provider activates the selected wireless device for use with one or more wireless networks provided by the wireless service provider in response to receiving the customer order. The activated selected wireless device is then shipped to a shipping address.

24 Claims, 4 Drawing Sheets

SYSTEM AND METHOD FOR A VIRTUAL INVENTORY PROGRAM FOR WIRELESS SALES AND SERVICES

PRIORITY CLAIM

This application claims priority to provisional application Ser. No. 61/089,309, filed on Aug. 15, 2008, entitled: System and Method for a Virtual Inventor Program for Wireless Sales and Services, which is incorporated herein by reference.

BACKGROUND

The purchase of wireless devices, such as, cell phones, in a retail store environment typically requires the physical stocking of the wireless devices by the retail store. Upon purchase of a wireless device, a customer typically has to endure a time-consuming activation and provisioning procedure before he or she can use the wireless device with a service provider's network.

BRIEF SUMMARY

An embodiment of a method for providing a virtual inventory program for wireless sales and service includes receiving an indication of a selected wireless device, and receiving an indication of a selected wireless rate plan associated with the selected wireless device. The method further includes storing a customer order including the selected wireless device and the selected wireless rate plan, and sending the customer order to a wireless service provider associated with at least one of the selected wireless devices and the selected wireless rate plan. The wireless service provider activates the selected wireless device for use with one or more wireless networks provided by the wireless service provider in response to receiving the customer order. The activated selected wireless device is then shipped to a shipping address.

An embodiment of an apparatus for providing a virtual inventory program for wireless sales and service includes a memory and at least one processor. The at least one processor is configured to retrieve computer readable instructions from the memory and execute the computer readable instruction so as to receive an indication of a selected wireless device, and receive an indication of a selected wireless rate plan associated with the selected wireless device. The at least one processor is further configured to store a customer order including the selected wireless device and the selected wireless rate plan, and send the customer order to a wireless service provider associated with at least one of the selected wireless devices and the selected wireless rate plan. The wireless service provider activates the selected wireless device for use with one or more wireless networks provided by the wireless service provider in response to receiving the customer order. The activated selected wireless device is then shipped to a shipping address.

DETAILED DESCRIPTION

Embodiments of a system and method provide for a virtual inventory program (VIP) platform to allow retail stores to offer wireless handsets and data devices without requiring the wireless handsets to be stocked in the store. In various embodiments, the VIP platform provides for wireless devices, wireless accessories, and wireless services ordering and fulfillment. Embodiments of the VIP platform further provide for application, submission, and approval of wireless service orders, and as well as, wireless device activation. Various embodiments provide for shipment directly to the end consumer in which the wireless device arrives at a customer's home in an already activated state, ready for use on the wireless network(s) offered by a wireless service provider.

In various embodiments, wireless devices may be sold using the VIP platform either with or without a wireless carrier service. In various embodiments, the VIP platform is interfaced with multiple wireless carrier systems for risk assessment, service provisioning, wireless device activation, and other transactions. In other embodiments, one or more of these transactions may be performed manually by agents of a provider of the VIP platform and recorded into customer care and fulfillment system of the VIP platform provider. Embodiments of the VIP platform provide a web-centric software and process platform that integrates the merchandising, provisioning, fulfillment, customer care, and billing functions for selling wireless devices in a retail store without requiring the wireless devices to be physically stocked in the retail store. In various embodiments, an in-store terminal can be deployed as a point-of-sale (POS) terminal, a computer terminal in the retail store, or as a stand-alone kiosk. In various embodiments, the VIP platform may be used to place an order for wireless services, wireless devices, and/or accessories by an end user, such as, a customer or a sales associate of the retail store. Embodiments of the invention provide for a single user interface to multiple wireless carrier systems, and fully automates sales, order management, fulfillment, provisioning, and customer care in a single platform. Embodiments of the invention do not require inventory to be stocked and managed in the retail location. Further, embodiments of the invention do not require store personnel to be trained to use ordering and activation systems associated with multiple carriers.

Figure 1:
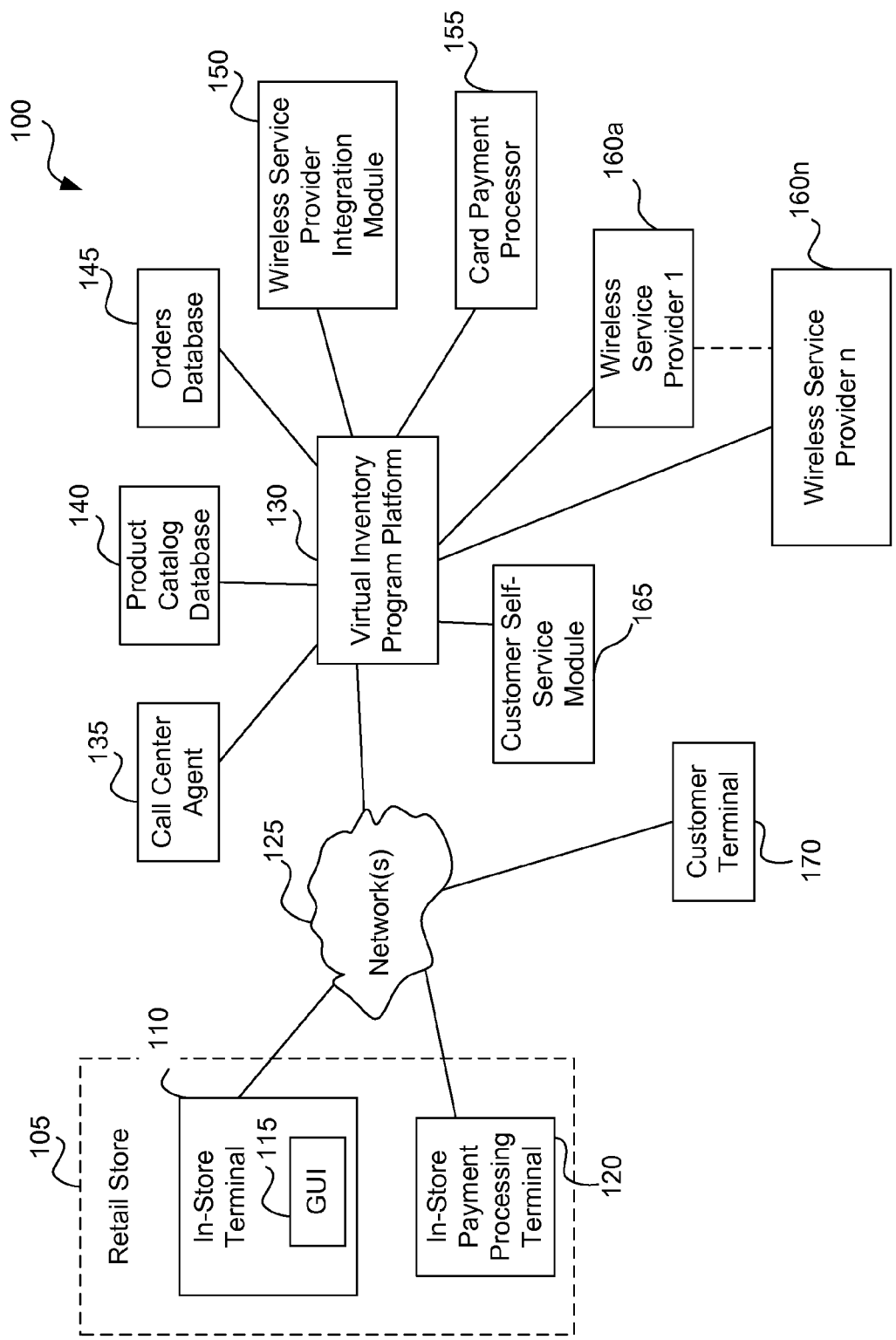
FIG. 1 is an embodiment of a VIP system for wireless device and wireless service sales and activation.

FIG. 1 is an embodiment of a VIP system 100 for wireless device and wireless service sales and activation. The system 100 includes a retail store environment 105. The retail store environment 105 includes an in-store terminal 110 having a graphical user interface (GUI) 115. The GUI 115 enables selection by a customer and/or a sales associate of a wireless device, such as, a handset, smart phone, or other wireless devices for purchase by the customer. The GUI 115 further enables purchase of wireless service plans, plan features, and/or wireless device accessories associated with the selected wireless device. The retail store environment 105 further includes an in-store payment processing terminal 120. In various embodiments, the in-store payment processing terminal 120 allows a customer to pay for the wireless device and other wireless products and services purchased using the in-store terminal 110. In various embodiments, a customer may pay for purchased items using the in-store payment processing terminal 120 via one or more of cash, a check, a credit card, a debit card, and/or any other financial instrument. In some embodiments, the customer may pay for purchased items using payment services such as PayPal or Google Checkout. In some embodiments, the in-store terminal 110 and in-store payment processing terminal 120 may be integrated into a single unit. The in-store terminal 110 and the in-store payment processing terminal 120 are in communication with a network(s) 125. In various embodiments, the network 125 may include one or more of a wireless network, a wired network, the Internet, a PSTN, a private network, or any other communication network.

The network 125 is in further communication with a VIP platform 130. The VIP platform 130 includes software and/or hardware configured to perform the various functions and operations of the VIP platform 130 described herein. In various embodiments, the VIP platform 130 may include one or more processors and associated computer-readable media configured to perform the various functions of the VIP platform 130 described herein. Functions that may be performed in various embodiments by the VIP platform 130 include processing wireless device and wireless plan purchases, collecting and submitting wireless service plan application information to one or more wireless service providers. In various embodiments, the wireless service plan application information is submitted to a wireless service provider by the VIP platform 130 using a software interface, such as, an Extensible Markup Language (XML) interface. In alternative embodiments, the VIP platform 130 may be located in the retail store environment 105 and/or integrated with the in-store terminal 110 instead of being in communication with the retail store environment 105 via the network(s) 125.

The VIP platform 130 is in further communication with a call center agent 135, a product catalog database 140, an orders database 145, a wireless service provider integration module 150, and a card payment processor 155. In at least one embodiment, the call center agent 135 allows a live agent to call a customer, or receive a call from a customer, to obtain additional customer information that may be needed to process a customer order or to resolve inconsistent customer identity information, such as, an incorrect social security number (SSN). In at least one embodiment, the product catalog database 140 includes a database of wireless devices, wireless rate plans, included plan features, optional plan features, available accessories, prices, offers and promotions for particular channels and price tiers offered for particular customers by one or more wireless service providers. In various embodiments, items in the product catalog database 140 may be rapidly updated by a retail store, a provider of the VIP platform 130, and/or a particular wireless service provider. In a particular embodiment, table-driven updates are made daily across one or more wireless devices offered by the retail store and wireless service providers supported by the VIP platform 130 without the need to take any components of the VIP platform 130 offline. In some embodiments, the VIP platform 130 is configured to provide support for filtering the product catalog database 140 to support viewing and selection of only the wireless device manufacturers, wireless service providers or carriers, and/or particular wireless devices that may be sold at a particular retail location.

In various embodiments, the orders database 145 is configured to store one or more customer orders made by one or more customers using the in-store terminal 110. In some other embodiments, the orders database 140 is configured to allow back-office processing with ordering systems associated with one or more wireless service providers. In at least one embodiment, the wireless service provider integration module 150 is configured to interface with risk assessment systems associated with one or more wireless service providers, as well as, interface with wireless device activation services associated with one or more wireless service providers. In at least one embodiment, the wireless service provider integration module 150 interfaces with risk assessment and activation services offered by wireless providers 160a-160n via a business-to-business (B2B) interface that may be adapted to operate with any wireless service provider 160a-160n using various wireless device technologies including, for example, CDMA, GSM, and iDEN. In various embodiments, the wireless service provider integration module 150 is further configured to perform an upgrade eligibility check, a number port eligibility check, number port transfer, and existing account lookup for one or more customers. In an alternative embodiment, the functions of the wireless service provider integration module 150 may be performed by one or more agents using systems provided by a one or more of a wireless service provider, a wireless carrier, or a provider of the VIP platform 130. In a particular embodiment, the one or more agents may utilize web-based systems provided by a wireless service provider and a customer care system provided by the provider of the VIP platform 130 to process and update systems associated with the VIP platform 130 with the results of these functions to facilitate fulfillment of customer orders. In at least one embodiment, the card payment processor 155 is configured to settle payments made using a credit card or other financial instrument with a financial institution, such as, a credit card issuing financial institution.

The VIP platform 130 is in further communication with one or more wireless service providers 160a-160n. Each of the wireless service providers 160a-160n provide one or more of wireless devices, rate plans for wireless service, plan features, and accessories. In various embodiments, the VIP platform 130 collects orders for wireless products from the in-store terminal 110, processes the orders, sends orders for wireless service to a selected wireless service provider 160a-160n, and facilitates shipping of wireless devices associated with the selected wireless service provider 160a-160n to a customer's home, or to a retail store location to allow for pickup by the customer. In various embodiment, the wireless devices are shipped by the provider of the VIP platform 130.

The VIP platform 130 is in further communication with a customer self-service module 165. In various embodiments, the customer self-service module 165 is configured to allow a customer to check the status of an order or to provide further information, such as, identity verification, a payment deposit, or an alternate plan selection via a customer terminal 170 in communication with the network 125. In at least one embodiment, the customer terminal 170 is a personal computer. In still other embodiments, the customer terminal 170 may include a wireless terminal, a cell phone, a PDA, or any other communication device. In at least one embodiment, a customer may interface with the customer self-service module 165 via an Internet connection. In still other embodiments, a customer may interface with the self-service module 165 by placing a voice call to a voice self-service system provided by the customer self-service module 165. In still other embodiments, the customer may check on the status of an order by calling the call center agent 135. In some embodiments, the call center agent 135 further enables a sales specialist to view the specific offer, such as, a particular wireless device and service plan combination, that a customer wishes to inquire about, and assist the customer with submitting an order to purchase the offer. In a particular embodiment, the customer may provide the sales specialist with a specific code associated with the offer, and the specialist may enter the specific code to call up and view the offer. In still other embodiments, the customer self-service module 165 may include an automated voice message dialer. In some embodiments, the automated voice message dialer may dial the customer's phone and leave a voice mail message prompting the customer to visit a self-service website to update customer order information, or to call credit and/or activation staff to, for example, gather donor account information to facilitate number porting or to schedule a live agent call with the customer regarding any credit issues associated with the customer.

Figure 2:
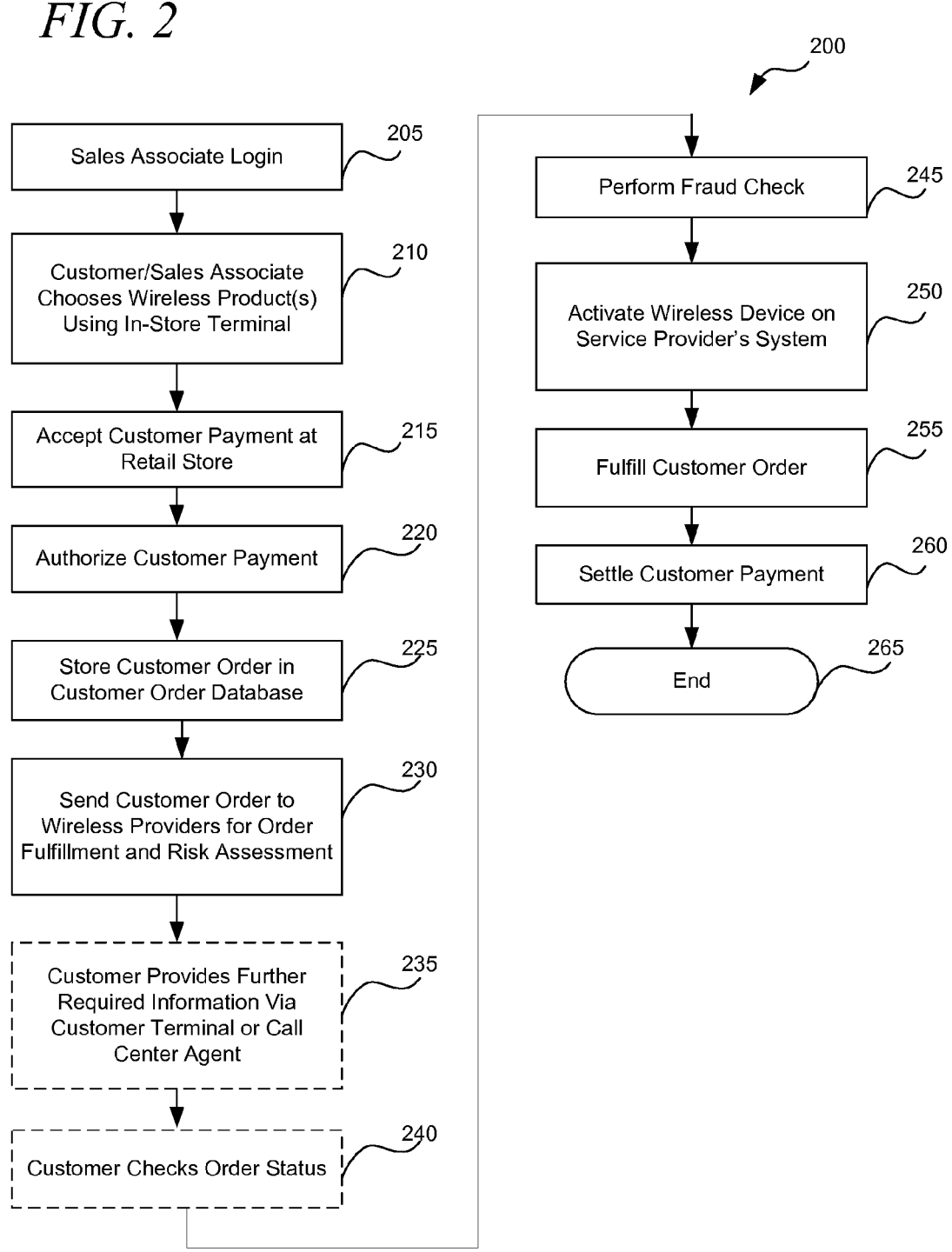
FIG. 2 is an embodiment of a process for wireless device and wireless service sales and activation.

FIG. 2 is an embodiment of a process 200 for wireless device and wireless service sales and activation. The process 200 begins in step 205 in which a sales associate at the retail store environment 105 logs into the in-store terminal 110 using the GUI 115. In one embodiment, the GUI 115 may include a sales associate log-in screen configured to allow a sales associate at the retail store environment 105 to enter a sales associate name, a store name, and a customer's zip code. In one embodiment, the sales associate log-in screen may further include a submit query selection dialog configured to allow the sales associate to submit the entered customer's zip code to the VIP platform 130. In still other embodiments, a sales associate login-in screen may be further configured to allow the sales associate to enter a store number associated with the retail store environment 105, and a sales associate number associated with the sales associate, as well as the customer's zip code. In at least one embodiment, the sales associate log-in screen may further include a summary of a particular embodiment of a VIP ordering procedure for display to the sales associate or the customer which includes logging in using a store number, choosing a model of a wireless device from a large selection of wireless devices, pairing the wireless device with a desired rate plan, adding the wireless device and rate plan to a shopping cart, completing the order, and checking out the order.

In step 210, a customer or sales associate chooses or selects wireless product(s) using the GUI 115 at the in-store terminal 110, and an indication of the selected wireless products are sent from the in-store terminal 110 to the VIP platform 130. In at least one embodiment, the customer or sales associate selects a wireless device for use with wireless services provided by the chosen wireless service provider 160a-160n and an indication of the selected wireless device is sent to the VIP platform 130. In various embodiments, the GUI 115 may display a highlight of top-selling cell phones or other wireless devices, and a link to a details page with additional images and information associated with each wireless device. The GUI 115 further enables selection of a particular wireless device by the customer or sales associate. Various embodiments may further allow selection of a wireless rate plan offered by the particular wireless provider 160a-160n, a link to rate plan details, and a highlight of the most popular rate plans offered using the GUI 115. Further embodiments of the GUI 115 may allow for the display of the most popular data plan features, as well as selection of a particular data plan for the use of data services with the wireless provider 120a-120n. In various embodiments, the wireless products offered for sale are retrieved from the product catalog database 140 and displayed using the GUI 115.

In step 215, payment from the customer is accepted at the retail store environment 105. Examples of payments that may be accepted at the retail store environment 105 include cash payments, checks, and/or credit card payments. In still other embodiments, the customer may make a payment by placing a call to the call center agent 135 and providing a credit card number, check authorization, or other type of payment authorization to an agent or sales specialist. In at least one embodiment, an indication of the customer's payment is sent to the VIP platform 130. In step 220, the customer's payment is authorized by a financial institution, such as, a card issuing bank. In at least one embodiment, customer payment information is sent to the financial institution from the VIP platform 130. In still other embodiments, the customer payment information is sent to the financial institution from the in-store payment processing terminal 120. In step 225, the customer order including the selected wireless products is stored in the orders database 145 by the VIP platform 130.

In step 230, the VIP platform 130 sends the customer order to the particular wireless provider 160a for order fulfillment and risk assessment. In some embodiments, the wireless service provider integration module 150 interfaces with risk assessment services offered by the particular wireless provider 160a. In at least one embodiment, risk assessment is performed to determine whether a particular customer will be granted authorization to purchase the wireless product(s), such as, a wireless device or wireless service plan that the customer has ordered. In an alternative embodiment, the wireless service provider integration module 150 may interface with the wireless provider 160a so that the wireless provider 160a may perform an upgrade eligibility check instead of a risk assessment process for upgrade or contract extension orders. In still another embodiment, the wireless service provider integration module 150 may interface with the wireless provider 160a so that the wireless service provider 160a may perform a number port eligibility check for the customer. In an optional step 235, the customer may provide further required information via the customer terminal 170 or the call agent 135 before the customer order is authorized. For example, the VIP platform 130 may use both out-bound email requests, in-bound web self-service access, and/or calls to or from customers to receive additional customer information to resolve inconsistent identity information, such as, an incorrect social security number, to clear potentially fraudulent orders. In an optional step 240, the customer may check the order status of his order for wireless product(s). In at least one embodiment, the customer may check the order status by logging into the VIP platform 130 via a website portal using, for example, the customer terminal 170, to retrieve order status information from the orders database 145.

In step 245, a fraud check on the customer or customer order is performed prior to shipment of the wireless product. In various embodiments, the VIP platform 130 includes sophisticated order fraud management capabilities including access to third party identity and credit data providers to obtain further information related to fraud prevention about the customer and/or the customer's order. In various embodiments, the VIP platform 130 develops a fraud risk score for each order processed based on a number of factors, including matches to a negative file, previously fraudulent orders, velocity filters, order cost, identity verification data, and credit card authorization data. The fraud risk score is used to determine the need for additional automated or manual order validation, or alternatively, to rejection of the order. In various embodiments, all fraud score parameters are customizable and have real-time metrics reporting availability that display the frequency that a particular fraud trigger is activated, and the frequency with which a shipment is blocked due to a fraud trigger. In an example embodiment, if a fraud score above "1" has been triggered on an order, the order will appear with a red border on a user interface displayed to an agent, and user interface controls will enable the agent to display the fraud triggers and any related orders that may share common order information. For example, all orders that share a common delivery address, which may potentially indicate a "drop box" for fraudulent deliveries, will be displayed to the agent. In various embodiments, the VIP platform 130 may suggest alternate and/or comparable product offerings from the initially chosen product offerings based on a customer's credit score result or a customer's unwillingness to pay a deposit.

Such a procedure can be used, for example, to set spending limits on an account or propose a "pay-as-you-go" policy for marginal risk customers.

In step 250, the selected wireless device is activated for use with wireless network(s) provided by the wireless service provider. The VIP platform 130 is configured to operate with a variety of wireless service providers and wireless device technologies including, for example, CDMA, GSM, and iDEN. In particular embodiments, the VIP platform 130 may interface with wireless service providers via XML or screen scraped technologies. In various embodiments, the VIP platform 130 may send an indication of the selected wireless device, wireless service plan, and plan feature information to the wireless service provider 160a-160n. The VIP platform 130 may send further information, such as, an electronic serial number (ESN), a international mobility equipment identity (IMEI), or a subscriber identity module (SIM) ID associated with the selected wireless device to the wireless service provider 160a-160n. In various embodiments, the VIP platform 130 records activation data including the mobile directory number (MDN) for the wireless device for use in care and fulfillment systems of the VIP platform provider. In some embodiment, the activation may further include porting of the customer's number such as supported by Wireless Local Number Portability (WLNP), which allows a customer to change wireless service providers within a given location while retaining the same phone number. The VIP platform 130 may further schedule manual or automated wireless device programming, in-service provisioning, and activation by the wireless service provider 160a. In various embodiments, a variety of activation types may be performed including new service activations without number port, new service activations with number port, upgrades, and contract extensions.

In step 255, the customer's order is fulfilled by shipping the customer's activated wireless device to either a customer shipping address, such as the customer's home, or to a shipping address associated with the retail store environment 105 for pickup by the customer. In at least one embodiment, the customer's order is shipped to the customer or retail store shipping address by the VIP platform provider. In an alternative embodiment, the customer's order may be shipped to the customer or retail store shipping address by the wireless service provider. In still another embodiment, the customer's order is shipped to the customer or retail store shipping address by an integrated third-party. In at least one embodiment, the customer's credit card is charged prior to, or immediately after, shipment of the wireless device. In various embodiments, a customer may receive a shipping confirmation email from the VIP platform 130 as soon as a package containing the customer's order is ready for shipping. The shipping confirmation email may include a tracking number allowing the customer to track the shipping progress of the customer's order. When the customer receives the shipment including the customer's wireless device, the customer's wireless device is already activated and ready for use with the wireless service plan provided by the wireless service provider. In various embodiments, the customer may then immediately begin using the wireless device without requiring the customer to call the wireless service provider and endure a time-consuming activation procedure. In at least one embodiment, when the customer is receiving a wireless device upgrade, activation may not be completed until after the customer has received the wireless device. In an alternative embodiment, the customer may transfer an existing phone number to the wireless device after fulfillment. In step 260, the customer's payment is settled with a financial institution.

In a particular embodiment, the financial institution may include a credit card issuing institution associated with a credit card used to purchase the order. In step 265, the procedure 200 ends.

Figure 3:
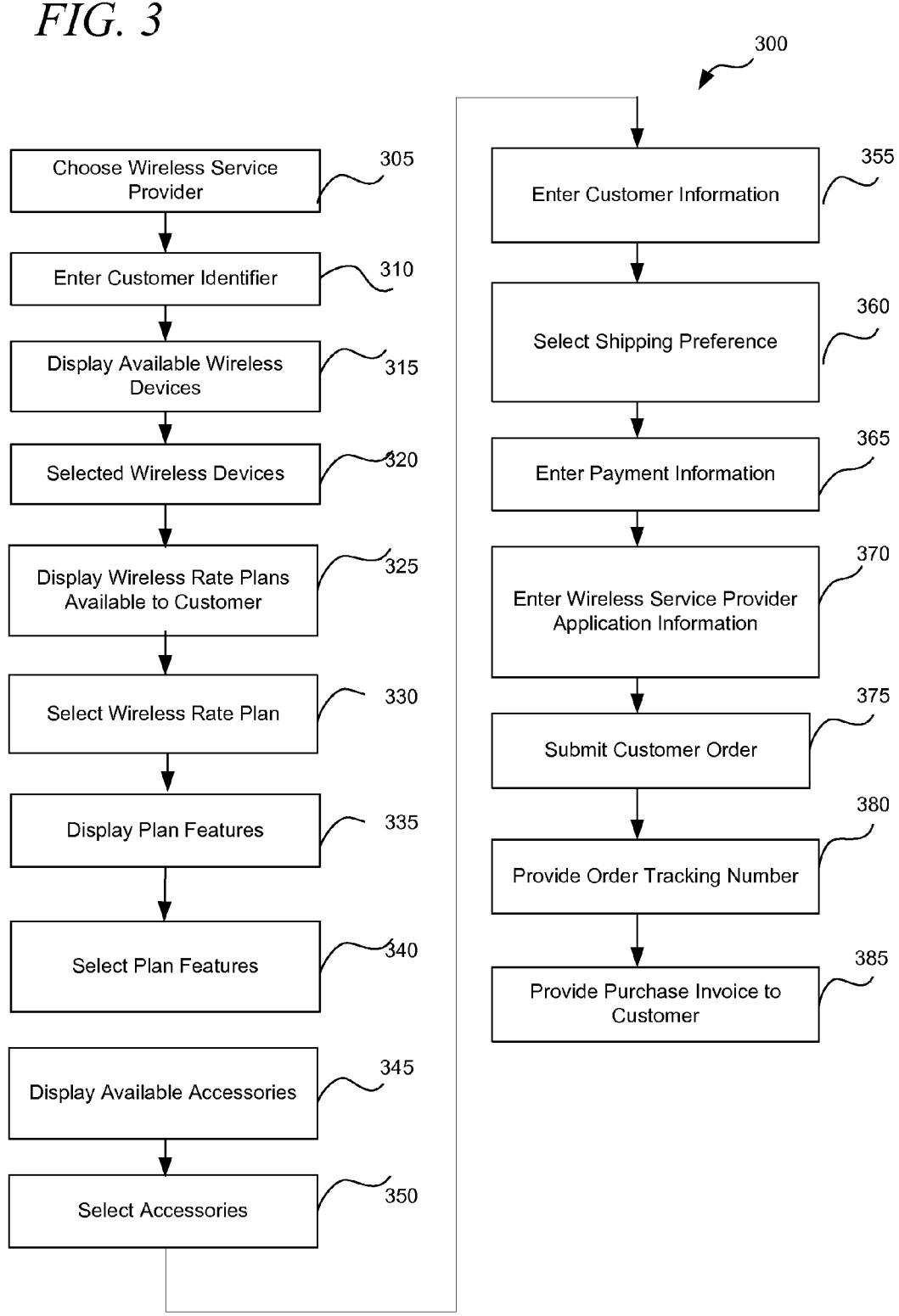
FIG. 3 is an embodiment of a procedure for choosing wireless products as described in step 210 of FIG. 2.

FIG. 3 is an embodiment of a procedure 300 for choosing wireless products as described in step 210 of FIG. 2. In step 305, a customer or sales associate chooses a particular wireless service provider 160a-160n using the GUI 115 of the in-store terminal 110. In step 310, the customer or sales associate enters a customer identifier associated with the chosen wireless service provider 160a-160n. In one embodiment, the customer identifier identifies the customer to the wireless service provider and associates the customer with an existing account with the wireless service provider 160a-160n. In a particular embodiment, the customer identifier is a unique number associated with the customer. In still another embodiment, the customer identifier may be the customer's name. In an alternative embodiment, if the customer is not an existing customer of the wireless service provider, the customer may either sign up for a customer identifier with the wireless service provider or alternately step 310 may be skipped. In step 315, the GUI 115 displays one or more wireless devices available for purchase by the customer. In at least one embodiment, the display of available wireless devices may be customized to the particular customer. In a particular embodiment, the display allows selection of one or more of a number of wireless devices available from one or more wireless device manufacturers. In a particular embodiment, a customer may wish to select more than one device, in particular if the customer has an existing family plan or wishes to sign up for a family plan. In step 320, the customers or sales associate selects the one or more desired wireless devices from the choices available using the GUI 115, and an indication of the selected wireless device is sent to the VIP platform 130.

In step 325, the GUI 115 displays one or more wireless rate plans available to the customer from the wireless service provider 160a. In at least one embodiment, the display of available wireless rate plans may be customized to the particular customer. In step 330, the customer or sales associate selects the desired wireless rate plan using the GUI 115 and an indication of the selected wireless rate plan is sent to the VIP platform 130. In at least one embodiment, the customer may select from among a variety of wireless rate plan types including single lines, family plans, and family plan add-on lines. In at least one embodiment, the GUI 115 displays a selected carrier and/or service provider, a selected wireless device, and a selected wireless plan. In step 335, the GUI 115 displays one or more calling plan features available to the customer. In step 340, customer or sales associate selects desired calling plan features and an indication of the selected calling plan features is sent to the VIP platform 130. Examples of calling plan features include one or more text messaging plans, multi-media messaging plans, or picture messaging plans. Other plan features that may be selected include wireless device protection services which offer to replace or repair a lost, damaged, or stolen wireless device. In step 345, the GUI 115 displays available accessories for which the customer may wish to purchase. Examples of accessories that may be available for a customer to purchase include wireless device chargers, headsets, and wireless device holsters or cases. In at least one embodiment, the GUI 115 is configured to provide a display and selection dialogs of accessories and calling plan features associated with the selected wireless device that are available for purchase by the customer. In at least one embodiment, the GUI 115 may further include a selection dialog configured to provide an option to switch the customer's existing wireless number to the new wireless device.

In step 350, the customer or sales associate may select any of the displayed accessories that are desirable for purchase by the customer and an indication of the selected accessories is sent to the VIP platform 130. In at least one embodiment, the GUI 115 is configured to display a shopping cart showing a selected service plan and selected wireless device. In at least one embodiment, the shopping cart may further display a price subtotal or total for the wireless products selected for purchase by the customer.

In step 355, the process 300 proceeds to checkout in which customer information is entered by the customer or the sales associate and sent to the VIP platform 130. In various embodiments, the customer information may include a first name, a middle initial, and a last name of the customer. Customer information may further include, an address, an email address, a daytime phone number, and a home phone number. In still other embodiments, the customer may specify different shipping addresses and billing addresses. In step 360, the customer or the sales associate may select a shipping preference using the GUI 115 and an indication of the selected shipping performance is sent to the VIP platform 130. The shipping preference may include, for example, a desired shipping company and/or desired shipment method for shipping the purchased wireless products. In step 365, the customer or sales associate may enter payment information for the wireless products purchased and the payment information is sent to the VIP platform 130. The payment information may include a payment type, such as, a type of credit card, a credit card number, a credit card expiration date, and a card number verification code. In still other embodiments, the payment information may include a Tax ID, an enterprise account number, and/or a donor carrier billing account number.

In step 370, the customer or sales associate enters wireless service provider application information and the wireless service provider application information is sent to the VIP platform 130. The wireless service provider application information is information required by the wireless service provider in order that an account may be opened with the wireless service provider to provide wireless services. Examples of wireless service provider application information includes a PIN associated with the customer, a SSN associated with the customer, a driver's license number, a licensing state, a license expiration date, a birthday associated with the customer, and any other information required by the wireless service provider. In at least one embodiment, the GUI 115 may be configured to display an order checkout screen including a customer information entry area, a shipping information selection and information area, a payment information and entry area, and a wireless provider application information entry area. In at least one embodiment, the order checkout screen may further include check boxes allowing the customer to agree to terms and conditions associated with the purchased wireless devices and/or wireless services. In step 375, the customer's order is submitted to the VIP platform 130. In a particular embodiment, the GUI 115 may provide a checkout screen 900 including a "submit order" button that functions to submit the customer's order to the VIP platform 130 when selected.

In step 380, the GUI 115 provides an order tracking number to the customer. In various embodiments, the order tracking number is generated by the VIP platform 130 and sent to the in-store terminal 110. The order tracking number allows the customer to track the progress of his or her order. In various embodiments, the customer may access a website portal and enter the tracking number to check progress of the order. In a particular embodiment, the customer may use the customer terminal 170 to access the website portal to track the progress of the order. In at least one embodiment, the GUI the may provide a purchase confirmation screen in which an order tracking number is displayed to the customer. In step 385, a purchase invoice screen is provided to the customer by the GUI 115. In one embodiment, the GUI 115 is configured to display a purchase invoice to the customer. In a particular embodiment, the purchase invoice may include a list of the wireless device(s), plan(s), and accessories purchased by the customer, as well as the purchase price of each. In at least one embodiment, a purchase invoice may be printed by a printing device located at the retail store environment 105. In some embodiments, a copy of the purchase invoice may be sent to the customer via e-mail. In still other embodiments, the customer may use the customer terminal 170 or any other terminal to access a website portal to allow the customer to view, download, and/or print the purchase invoice.

Figure 4:
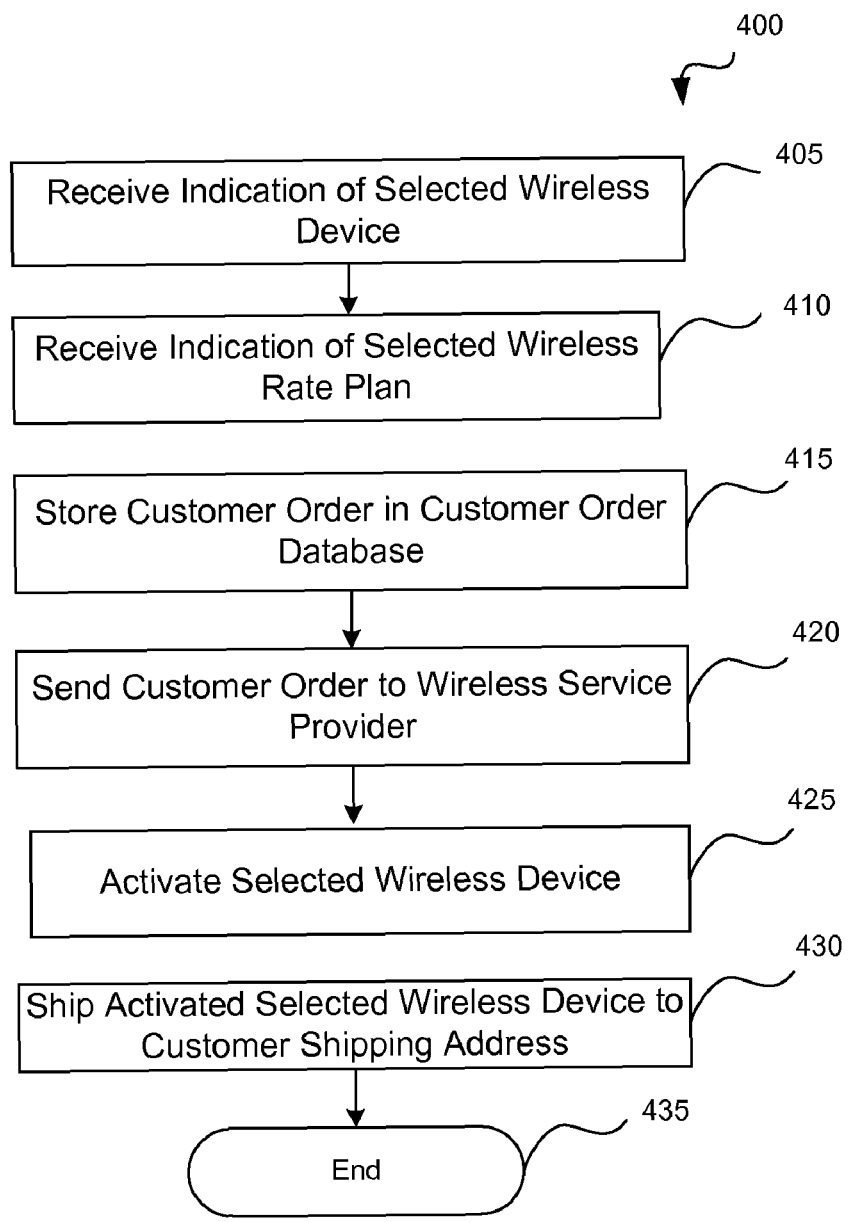
FIG. 4 is an embodiment of a procedure for providing a virtual inventory program for wireless sales and service.

FIG. 4 is an embodiment of a procedure 400 for providing a virtual inventory program for wireless sales and service. In step 405, the VIP platform 130 receives an indication of a selected wireless device. In step 410, the VIP platform 130 receives an indication of a selected wireless rate plan associated with the selected wireless device. In a particular embodiment, a customer selects the selected wireless device and the selected wireless rate plan at an in-store terminal 110, and the in-store terminal 110 sends the indication of the selected wireless device and the indication of the selected wireless rate plan to the VIP platform 130. In step 415, the VIP platform 130 stores a customer order including the selected wireless devices and the selected wireless rate plan in the orders database 145. In step 420, the VIP platform 130 sends the customer order to a wireless service provider associated with at least one of the selected wireless device and the selected wireless rate plan. In step 425, the wireless service provider activates the selected wireless device for use with one or more wireless networks provided by the wireless service provider in response to receiving the customer order. In step 430, the VIP platform provider ships the activated selected wireless device to a customer shipping address. In an alternative embodiment, the wireless service provider may ship the activated selected wireless device to the customer shipping address. In another embodiment, the activated selected wireless device may be shipped to a retail store location to allow pickup by the customer. In step 435, the procedure 400 ends.

When the customer receives the shipment including the selected wireless device, the wireless device is already activated and ready for use by the customer with the wireless service plan provided by the wireless service provider. In alternative embodiments, the wireless device may not be activated prior to shipment and may not arrive ready to receive calls, although it may be able to initiate calls. In one such embodiment, activation of the wireless device is triggered by delivery notification from a freight carrier. In another embodiment, activation of the wireless device is triggered by if a predetermined time period has elapsed and delivery notification has not been received. In still another embodiment, activation of the wireless device may be triggered by the customer contacting the wireless service provider or VIP platform provider, such as via phone, email, or chat. In some embodiments, an existing phone number is transferred to the new wireless device and/or SIM card after shipping and reception by the customer before the new wireless device is activated to receive incoming calls.

The illustrative embodiments can take the form of an entirely hardware embodiment, an entirely software embodiment, or an embodiment containing both hardware and software elements. Furthermore, the illustrative embodiments can take the form of a computer program product accessible from a computer-usable or computer-readable medium providing program code for use by or in connection with a computer or any instruction execution system. For the purposes of this description, a computer-usable or computer-readable medium can be any tangible apparatus that can contain, store, communicate, propagate, or transport the program for use by or in connection with the instruction execution system, apparatus, or device. In various embodiments, the VIP platform 130 includes one or more processors operable to execute computer executable instructions from a computer-usable or computer-readable medium to perform the various capabilities of the VIP platform 130 described herein.

The computer-usable or computer-readable medium can be an electronic, magnetic, optical, electromagnetic, infrared, or semiconductor system (or apparatus or device) or a propagation medium. Examples of a computer-readable medium includes a semiconductor or solid state memory, magnetic tape, a removable computer diskette, a random access memory (RAM), a read-only memory (ROM), a rigid magnetic disk, and an optical disk. Current examples of optical disks include compact disk-read only memory (CD-ROM), compact disk-read/write (CD-R/W), and DVD.

Further, a computer storage medium may contain or store a computer-readable program code, such that when the computer-readable program code is executed on a computer, the execution of this computer-readable program code causes the computer to transmit another computer-readable program code over a communication link. This communication link may use a medium that is, for example, without limitation, physical, or wireless.

The previous detailed description is of a small number of embodiments for implementing the invention and is not intended to be limiting in scope. One of skill in this art will immediately envisage the methods and variations used to implement this invention in other areas than those described in detail.

What is claimed:

1. A method for providing a virtual inventory program for wireless sales and service comprising:
    updating a database of available wireless devices and available wireless rate plans from a plurality of wireless service providers for communication to a customer;
    receiving a first indication of a selected wireless device;
    receiving a second indication of a selected wireless rate plan associated with the selected wireless device, the first indication and the second indication being enabled to be received from a sales associate and the customer at a retail location;
    storing a customer order including the selected wireless device and the selected wireless rate plan; and
    sending the customer order to a wireless service provider associated with at least one of the selected wireless device and the selected wireless rate plan, the wireless service provider activating the selected wireless device for use with one or more wireless networks provided by the wireless service provider in response to receiving the customer order, wherein the activated selected wireless device is shipped to a shipping address.

2. The method of claim 1, wherein the shipping address is a customer shipping address, wherein the database is communicated to the customer through a display, and wherein the updating is performed at least daily.

3. The method of claim 1, wherein the shipping address is associated with a retail store location, and wherein the database is communicated to the customer by the sales associate.

4. The method of claim 1 further comprising:
    displaying, by an in-store terminal, an indication of at least one wireless device available for purchase by the customer; and
    receiving a selection of the selected wireless device from the at least one wireless devices through the in-store terminal.

5. The method of claim 4, further comprising:
    sending the indication of the selected wireless device and the selected wireless rate plan from the in-store terminal.

6. The method of claim 1 further comprising:
    displaying, by an in-store terminal, an indication of at least one wireless rate plan associated with the selected wireless device available for purchase by the customer;
    receiving a selection of the selected wireless rate plan from the at least one wireless rate plan through the in-store terminal.

7. The method of claim 5, wherein the first indication and the second indication are sent to a device associated with the customer.

8. The method of claim 1 further comprising:
    accepting payment from the customer for purchase of the selected wireless device and the selected wireless rate plan from an in-store terminal.

9. The method of claim 1 further comprising:
    sending customer payment information to a financial institution for authorizing the payment from the customer; and
    settling the customer payment with the financial institution in response to performing a risk assessment and determining the customer order is valid.

10. The method of claim 9 wherein the risk assessment includes at least a fraud risk score for each order processed based on a number of factors, including at least matches to a negative file, previously fraudulent orders velocity filters, order cost, identity verification data, and credit card authorization data.

11. The method of claim 9, wherein the wireless service provider performs a risk assessment on the customer order to determine whether a particular customer will be granted authorization to purchase at least one of the selected wireless device and the selected wireless rate plan prior to activation of the selected wireless device.

12. The method of claim 1, further comprising:
    performing an upgrade eligibility check on the customer order.

13. The method of claim 1, further comprising:
    performing a number port eligibility check on the customer order.

14. The method of claim 1, further comprising:
    performing a fraud check on the customer order prior to shipping the selected wireless device.

15. An apparatus for providing a virtual inventory program for wireless sales and service comprising:
    a memory; and
    at least one processor, the at least one processor configured to retrieve computer readable instructions from the memory and execute the computer readable instruction so as to:
        update a database of available wireless devices and available wireless rate plans from a plurality of wireless service providers for communication to a customer;
        receive a first indication of a selected wireless device;
        receive a second indication of a selected wireless rate plan associated with the selected wireless device, the first indication and the second indication being enabled to be received from a sales associate and a customer at a retail location; and store a customer order including the selected wireless device and the selected wireless rate plan;

send the customer order to a wireless service provider associated with at least one of the selected wireless device and the selected wireless rate plan, the wireless service provider activating the selected wireless device for use with one or more wireless networks provided by the wireless service provider in response to receiving the customer order, wherein the activated selected wireless device is shipped to a shipping address.

16. The apparatus of claim 15, wherein the apparatus is configured to receive the indication of the selected wireless device from an in-store terminal.

17. The apparatus of claim 16, wherein the in-store terminal is configured to display an indication of the available wireless devices for purchase by a customer, receive a selection of the selected wireless device from the available wireless devices, and send the indication of the selected wireless device to the apparatus.

18. The apparatus of claim 15, wherein the apparatus is configured to receive the indication of the selected wireless rate plan from an in-store terminal.

19. The apparatus of claim 18, wherein the in-store terminal is configured to display an indication of at least one wireless rate plan associated with the selected wireless device available for purchase by the customer, receive a selection of the selected wireless rate plan from the at least one wireless rate plan, and send the indication of the selected wireless device to the apparatus.

20. The apparatus of claim 15, wherein the at least one processor is further configured to accept payment from the customer for purchase of the selected wireless device and the selected wireless rate plan.

21. The apparatus of claim 20, wherein the at least one processor is further configured to send customer payment information to a financial institution for authorizing the payment from the customer.

22. The apparatus of claim 21, wherein the at least one processor is further configured to settle the customer payment with the financial institution.

23. The apparatus of claim 15, wherein the wireless service provider performs a risk assessment on the customer order to determine whether a particular customer will be granted authorization to purchase at least one of the selected wireless device and the selected wireless rate plan.

24. The apparatus of claim 15, wherein the at least processor is further configured to calculate a fraud risk score as part of the risk assessment, and to perform an additional validation in response to the fraud risk score being above a threshold.

* * * * *